(12) United States Patent  
Clemons et al.

(10) Patent No.: US 7,000,585 B2  
(45) Date of Patent: Feb. 21, 2006

(54) PREASSEMBLY TOOL

(75) Inventors: Douglas M. Clemons, Gurnee, IL (US); Stephen M. Yob, Tucson, AZ (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 665 days.

(21) Appl. No.: 10/245,084

(22) Filed: Sep. 17, 2002

(65) Prior Publication Data

US 2004/0051253 A1  Mar. 18, 2004

(51) Int. Cl.  
*F02F 7/00* (2006.01)

(52) U.S. Cl. ............... 123/195 C; 24/453; 411/508

(58) Field of Classification Search ............ 123/195 C; 411/508–510, 353, 913; 24/279, 453  
See application file for complete search history.

(56) References Cited

U.S. PATENT DOCUMENTS

| | | |
|---|---|---|
| 1,921,379 A | 8/1933 | Bailey |
| 2,568,390 A | 9/1951 | Gehrke |
| 2,593,648 A | 4/1952 | Aukers et al. |
| 2,639,832 A | 5/1953 | Bergstrom |
| RE24,065 E | 10/1955 | Bergstrom |
| 2,745,521 A | 5/1956 | White |
| 2,826,807 A | 3/1958 | Harris |
| 3,261,086 A | 7/1966 | Dunn |
| 3,618,443 A | 11/1971 | Fitzner |
| 4,221,039 A | 9/1980 | Smith |
| 4,524,979 A | 6/1985 | Bauder |
| 4,715,095 A | 12/1987 | Takahashi |
| 4,730,836 A | 3/1988 | Miller et al. |
| 4,819,954 A | 4/1989 | Fucci et al. |
| 4,973,212 A | 11/1990 | Jacobs |
| 5,186,591 A | 2/1993 | Malks |
| 5,529,313 A | 6/1996 | Malks |
| 5,645,282 A | 7/1997 | Belter |
| 6,161,840 A | 12/2000 | Boardman et al. |
| 6,209,178 B1 * | 4/2001 | Wiese et al. .............. 24/453 |

\* cited by examiner

*Primary Examiner*—Noah P. Kamen  
(74) *Attorney, Agent, or Firm*—Howard & Howard

(57) ABSTRACT

A tool for preassembling with an oil pan a bolt-locating isolator rail and a gasket such that the isolator rail locates a plurality of bolts for securing a flange of the oil pan to an engine block and the gasket forms an oil-tight seal between the flange and the engine block. The tool has a head, a body and a neck between the head and the body. The neck is of reduced diameter relative to the adjacent portions of the head and the body. The head has a first slot adapted to receive an aperture in the gasket. The neck is adapted to receive an aperture in the flange. The body has a reduced midsection adapted to receive an aperture in the isolator rail.

18 Claims, 2 Drawing Sheets

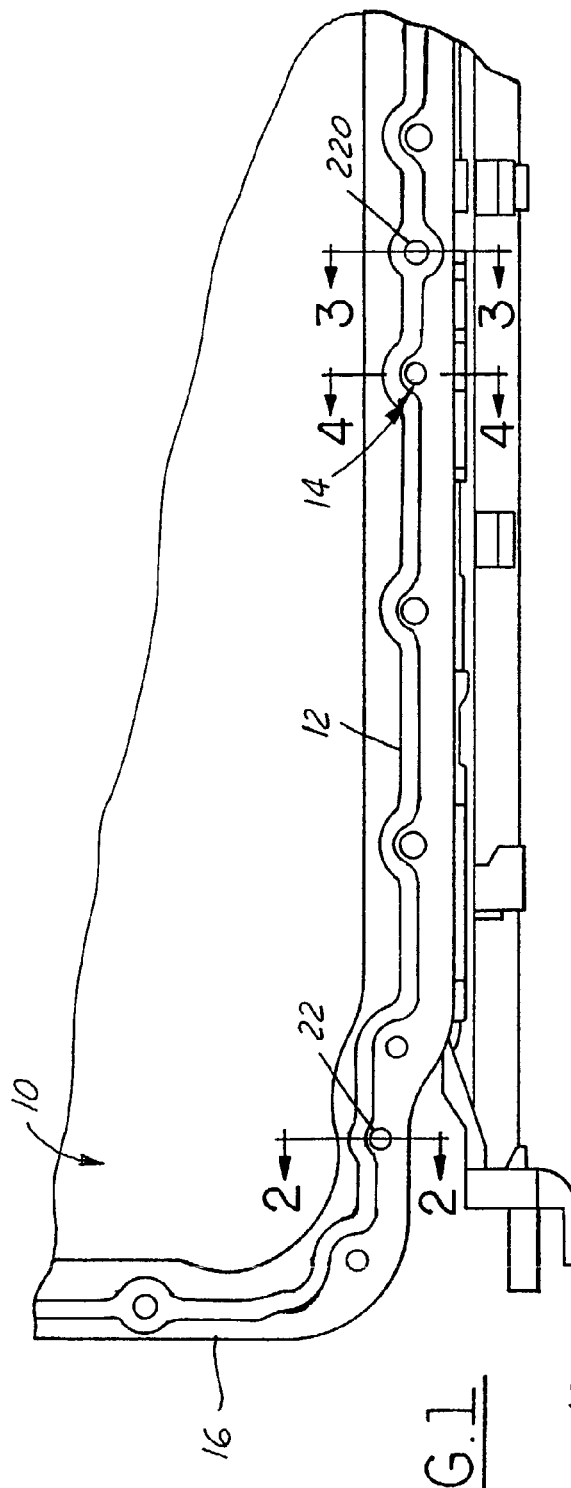

PREASSEMBLY TOOL

This invention relates generally to preassembly tools and more particularly to a tool for preassembling mating components such as an oil pan and gasket of an automotive vehicle.

BACKGROUND OF THE INVENTION

Typically the oil pan of an automotive vehicle is secured to the engine block by bolts extending through a flange of the oil pan into threaded bores in the block. An isolator rail locates the bolts. A gasket forms an oil-tight seal between the oil pan and the block. What is needed is a tool for preassembling the oil pan, gasket and isolator rail to provide proper alignment thereof and to insure proper guidance of the bolts into the threaded bores of the block.

SUMMARY OF THE INVENTION

The preassembly tool of this invention has a head, a neck and a body. The tool may be made of a suitable flexible, compressible material such as Nylon or a suitable elastomer. The head of the tool is slotted to engage an aperture of the gasket. The neck is constricted to provide a recess for engaging an aperture in a flange of the oil pan. In this way, the gasket is preassembled with the oil pan prior to bolting the pan to the block. The body of the tool has a midsection to engage an aperture in the isolator rail. The rail typically extends continuously around the flange and captures and locates the bolt assemblies which attach the oil pan to the block.

One advantage of the present invention is that the tool or tools remain in place even following assembly of the oil pan to the engine block. Thus the tool or tools not only aid in preassembling the gasket and isolator bolt assemblies to the oil pan, but become a neutral part of the final assembly not requiring removal.

One object of this invention is to provide a preassembly tool having the foregoing features and advantages.

BRIEF DESCRIPTION OF THE DRAWINGS

These and other features and advantages of the present invention will become more readily appreciated when considered in connection with the following detailed description and appended drawings, wherein:

FIG. 1 is a fragmentary elevational view showing the bolt assemblies and preassembly tools of this invention installed in the flange of an oil pan;

FIG. 2 is a sectional view taken on the line 2—2 in FIG. 1;

FIG. 3 is a sectional view taken on the line 3—3 in FIG. 1;

FIG. 4 is a sectional view taken on the line 4—4 in FIG. 1;

DETAILED DESCRIPTION OF THE PREFERRED EMBODIMENTS

Figure 5:
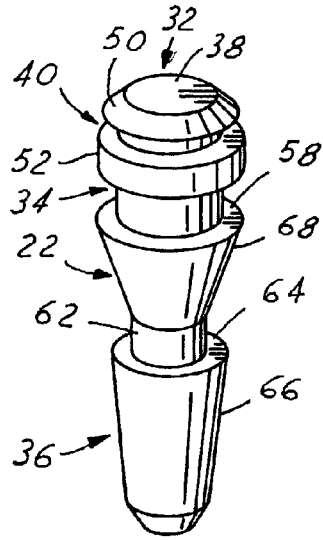
FIG. 5 is a perspective view of a preassembly tool constructed in accordance with the invention.

There is partially shown in FIGS. 1–4 an oil pan 10, a gasket 12, a plurality of bolt assemblies 14 for securing an annular flange 16 of the oil pan to an engine block 18, an isolator rail 20 extending continuously around the oil pan beneath the flange 16, and a plurality of preassembly tools 22 (FIG. 2) and 220 (FIG. 3) which are of similar, although slightly different, construction. The gasket 12 forms an oil-tight seal between the flange 16 of the oil pan and the engine block 18. While all of the preassembly tools in any installation will normally be of one construction or the other, both are shown in the installation of FIG. 1. The bolt assemblies 14 extend through apertures 23 in the isolator rail 20, through aligned apertures 25 and 27 in the flange 16 and gasket 12, into threaded holes in the engine block 18. The tools 22 and/or 220 serve as a means to preassemble the gasket 12, the oil pan 10 and isolator rail 20 so that these components broadly referred to in some of the appended claims as "panels", are properly aligned with one another and the bolt assemblies 14 are located properly for threaded engagement in the holes of the engine block 18.

Figure 6:
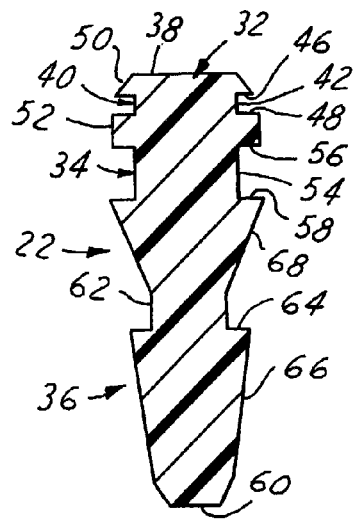
FIG. 6 is a longitudinal sectional view of the tool.
Figure 7:
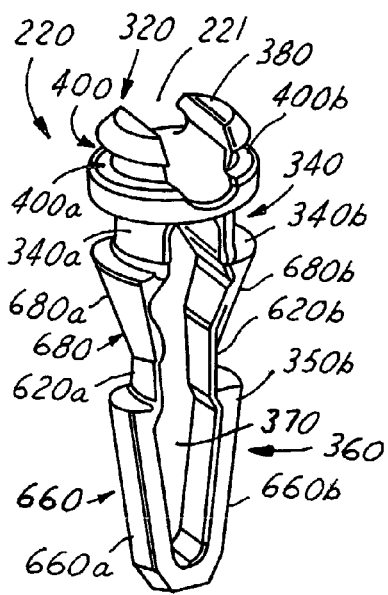
FIG. 7 is a perspective view of a preassembly tool of modified construction.
Figure 8:
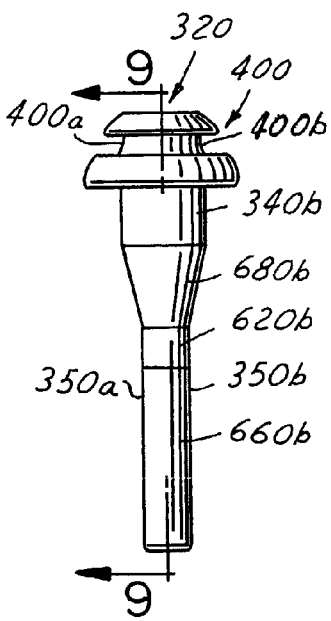
FIG. 8 is a side view of the preassembly tool shown in FIG. 7.
Figure 9:
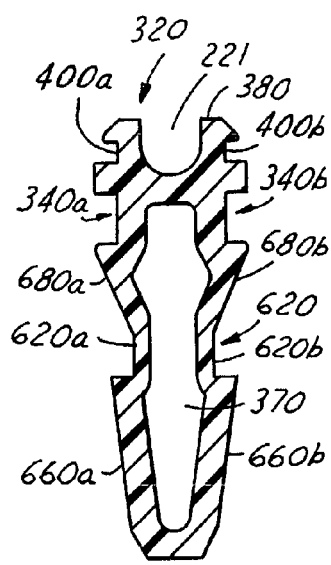
FIG. 9 is a sectional view taken on the line 9—9 in FIG. 8.

Each tool 22 is of solid construction and is in the form of an elongated member having a head 32, a neck 34 and a body 36 (see FIGS. 2, 5 and 6), and is preferably made of a flexible, compressible material such as Nylon or a suitable elastomer.

The head 32 has a top end 38 and a circular groove or slot 40. The circular slot 40 is between and spaced from the top end of the head and the neck 34. The slot 40 has a cylindrical base 42 concentric with the longitudinal centerline of the tool, and annular upper and lower walls 46 and 48 perpendicular to the base 42. Side surface portions 50 of the head, between its top end 38 and the slot 40 are tapered toward the top end. The slot 40 is spaced from the neck 34 by a cylindrical surface 52 of the head 32 which is concentric with the longitudinal centerline of the tool.

The neck 34 is of reduced cross-section relative to the head 32 and to the adjacent portion of the body 36. The neck has a cylindrical base 54 concentric with the longitudinal centerline of the body, and annular upper and lower walls 56 and 58 perpendicular to the base 54. The lower wall 58 provides an upwardly facing shelf.

The body 36 extends from the lower wall 58 of the neck 34 to the bottom end 60. At an intermediate point in its length, the body has a reduced annular midsection 62 which is cylindrical and concentric with the longitudinal centerline of the tool. Extending radially outwardly from the lower extremity of the midsection 62 is a circular wall or shelf 64 which faces upwardly and is perpendicular to the longitudinal centerline of the tool. The body 36 has frusto-conical side surface portions 66 extending from the shelf 64 to the bottom end 60 of the tool and tapering downwardly toward the bottom end. The body 36 also has frusto-conical side surface portions 68 extending from the shelf 58 to the upper extremity of the midsection 62 and tapering downwardly toward the midsection 62.

The apertures 23, 25 and 27 in the isolator rail 20, the flange 16 and the gasket 12 are approximately the same diameter as the respective midsection 62, neck 34, and slot 40 of the tool.

The tool 22 is insertable in an aperture 27 in the gasket 12, top end first, to place the aperture 27 in the slot 40 in the head 32. The side surface portions 50 of the head, being compressible and tapered toward the top end, facilitate such insertion.

The tool 22 is insertable into an aperture 25 in the flange 16 of the oil pan, bottom end first, to place the aperture 25 in the neck 34 of the tool. The tapered surface portions 66 and 68 of the body 36 facilitate the movement of the tool through the aperture 25 until the aperture lodges in the neck. The compressibility of the tool permits the passage of the aperture 25 over the tapered surfaces 66 and 68. The flange 16 rests on the shelf 58.

The tool is also insertable into an aperture 23 in the isolator rail 20 by moving the tool, bottom end first, into the aperture 23 causing the aperture to compress the tapered surface portions 66 of the body portion and pass over such tapered surface portions until the aperture 23 seats in the reduced midsection 62 of the body 36. The isolator rail 20 rests on the shelf 64.

The tool 220 (see FIGS. 3 and 7–9) is similar structurally and functionally to the tool 22. However the head 320 of the tool 220 differs from the head 32 of the tool 22 by having a transverse, diametral recess 221 across the top end 380, dividing the slot 400 into two separated arcuate slot segments 400a and 400b.

The neck 340 and body 360 of the tool 220 differ from the neck 34 and body 36 of the tool 22 in that the opposite sides are cut away providing flat surfaces 350a and 350b, and further in that the neck and body are slotted and cut through from one side to the other where indicated at 370. As a result, the neck 340, instead of being a continuous circular annulus like the neck 34 of the tool 22, is divided into two arcuate segments 340a and 340b. The side surface portions 680, instead of being of continuous, frusto-conical form like the side surface portions 68 of the tool 22, are divided into two separated similarly shaped segments 680a and 680b. The midsection 620, instead of being a continuous circular annulus like the midsection 62 of the tool 22, is divided into two separated arcuate segments 620a and 620b. The side surface portions 660, instead of being of continuous frusto-conical form like the side surface portions 66 of the tool 22, are divided into two separated similarly shaped segments 660a and 660b.

The tool 220 other than as described in the previous paragraph is like the tool 22 and functions in a similar manner, although the tool 220, is somewhat more flexible than the tool 22 because of its slotted, cut through construction. The slot 400, the neck 340, and the midsection 620 of the tool 220 receive the apertures 27, 25 and 23 of the gasket 12, the flange 16 and the isolator rail 20 in the same manner as the slot 40, neck 34 and midsection 62 of the tool 22.

Obviously, many modifications and variations of the present invention are possible in light of the above teachings. it is, therefore, to be understood that within the scope of the appended claims, the invention may be practiced otherwise than as specifically described. The invention is defined by the claims.

What is claimed is:

1. A tool for preassembling first, second and third panels, said tool comprising:
    an elongated, resilient, compressible member having a head, a body and a neck between the head and the body,
    said neck being of reduced diameter relative to adjacent portions of said head and said body,
    said head having a first slot adapted to receive a first aperture in the first panel,
    said neck adapted to receive a second aperture in the second panel, and
    said body having a reduced midsection adapted to receive a third aperture in the third panel.

2. The tool of claim 1, wherein said neck has a shelf adjacent to said body adapted to support an annular portion of the second panel around the second aperture.

3. The tool of claim 1, wherein said head has a top end spaced from said first slot and also has side head surface portions between said top end and said first slot, said head being insertable into the first aperture in the first panel, the top end first, to place the first aperture in said first slot, and said side head surface portions being tapered toward said top end to facilitate such insertion.

4. The tool of claim 1, wherein said body has a bottom end and side body surface portions between said bottom end and said reduced midsection, said tool being insertable into the third aperture in the third panel, the bottom end first, to place the third aperture in said reduced midsection, and said side body surface portions being tapered toward said bottom end to facilitate such insertion.

5. The tool of claim 4, wherein said reduced midsection has a shelf separating said midsection from said side body surface portions to support an annular portion of the third panel around the third aperture.

6. The tool of claim 1, wherein said body has a bottom end and first side body surface portions between said bottom end and said reduced midsection, said body has second side body surface portions between said reduced midsection thereof and said neck, said tool being insertable into the second panel, the bottom end first, to place the second aperture in said neck, said first side body surface portions being tapered toward said bottom end and said second side body surface portions being tapered toward said reduced midsection to facilitate such insertion.

7. A tool for preassembling with an oil pan a bolt-locating isolator rail and a gasket such that the isolator rail locates a plurality of bolts for securing a flange of the oil pan to an engine block and the gasket forms an oil-tight seal between the flange and the engine block, the tool comprising:
    an elongated, resilient, compressible member having a head, a body and a neck between the head and the body,
    said neck being of reduced diameter relative to the adjacent portions of said head and said body,
    said head having a first slot adapted to receive a first aperture in the gasket,
    said neck adapted to receive a second aperture in the flange, and
    said body having a reduced midsection adapted to receive a third aperture in the isolator rail.

8. The tool of claim 7, wherein
    said head has a top end spaced from said first slot and also has side head surface portions between said top end and said first slot,
    said head being insertable into the first aperture in said gasket, the top end first, to place the first aperture in said first slot,
    said side head surface portions being tapered toward said top end to facilitate such insertion,
    said body having a bottom end and first side body surface portions between said bottom end and said reduced midsection,
    said body having second side body surface portions between said reduced midsection and said neck,
    said tool being insertable into the second aperture in the flange, the bottom end first, to place the second aperture in said neck,
    said first and second side body surface portions being tapered toward said bottom end to facilitate such insertion of said tool into the second aperture in the flange, said tool being insertable into the third aperture in the isolator rail, the bottom end first, to place the third aperture in said reduced midsection, the taper of the first side body surface portions facilitating such insertion of the tool into the third aperture in the isolator rail.

9. The tool of claim 8, wherein said tool is of solid construction.

10. The tool of claim 8, wherein the neck and body are slotted and cut through from one side to the other to increase the flexibility of said tool.

11. In combination, an oil pan, an isolator rail for locating a plurality of bolts to secure a flange of the oil pan to an engine block, a gasket adapted to form an oil-tight seal between the flange of the oil pan and the engine block, a tool for preassembling the oil pan, the isolator rail and the gasket, said tool comprising:

an elongated, resilient, compressible member having a head, a body and a neck between the head and the body, said neck being of reduced diameter relative to adjacent portions of said head and said body, said head having a first slot receiving a first aperture in the gasket, said neck receiving a second aperture in the flange, and said body having a reduced midsection receiving a third aperture in the isolator rail.

12. The tool of claim 11, wherein said neck has a shelf adjacent to said body adapted to support an annular portion of the flange around the second aperture.

13. The tool of claim 12, wherein said head has a top end spaced from said first slot and also has side head surface portions between said top end and said first slot, said head being insertable into the first aperture in the gasket, the top end first, to place the first aperture in said first slot, and said side head surface portions being tapered toward said top end to facilitate such insertion.

14. The tool of claim 13, wherein said body has a bottom end and first side body surface portions between said bottom end and said reduced midsection, said body has second side body surface portions between said reduced midsection thereof and said neck, said tool being insertable into the second aperture of the flange, the bottom end first, to place the second aperture in said neck, said first side body surface portions being tapered toward said bottom end and said second side body surface portions being tapered toward said reduced midsection to facilitate such insertion.

15. The tool of claim 14, wherein said tool is insertable into the third aperture in the isolator rail, the bottom end first, to place the third aperture in said reduced midsection, and the taper of said first side body surface portions facilitating such insertion.

16. The tool of claim 15, wherein said reduced midsection has a shelf separating said midsection from said side first body surface portions to support an annular portion of the isolator rail around the third aperture.

17. The tool of claim 16, wherein said tool is of solid construction.

18. The tool of claim 16, wherein the neck and body are slotted and cut through from one side to the other to increase the flexibility of said tool.

* * * * *